(12) United States Patent
Kim

(10) Patent No.: US 11,601,612 B2
(45) Date of Patent: Mar. 7, 2023

(54) IMAGING DEVICE AND METHOD OF OPERATING THE SAME

(71) Applicant: Samsung Electronics Co., Ltd., Suwon-si (KR)

(72) Inventor: Youngwoong Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/549,018

(22) Filed: Dec. 13, 2021

(65) Prior Publication Data

US 2022/0337775 A1 Oct. 20, 2022

(30) Foreign Application Priority Data

Apr. 14, 2021 (KR) .................. 10-2021-0048135

(51) Int. Cl.
*H04N 5/378* (2011.01)
*H04N 5/376* (2011.01)
*H04N 5/369* (2011.01)

(52) U.S. Cl.
CPC ........... *H04N 5/378* (2013.01); *H04N 5/3698* (2013.01); *H04N 5/3765* (2013.01)

(58) Field of Classification Search
CPC ..... H04N 5/3698; H04N 5/3765; H04N 5/378
See application file for complete search history.

(56) References Cited

U.S. PATENT DOCUMENTS

| 6,492,983 B2 | 12/2002 | Nishitani et al. |
| 9,866,775 B2 | 1/2018 | Lee et al. |
| 10,506,184 B2 | 12/2019 | Kato et al. |
| 2012/0154649 A1 | 6/2012 | Itzhak et al. |
| 2018/0352178 A1* | 12/2018 | Kato .................. H04N 5/3742 |

FOREIGN PATENT DOCUMENTS

| JP | H06-225185 A | 8/1994 |
| JP | 2001-249642 A | 9/2001 |
| JP | 4484103 B2 | 6/2010 |

* cited by examiner

*Primary Examiner* — Lin Ye
*Assistant Examiner* — Chriss S Yoder, III
(74) *Attorney, Agent, or Firm* — Harness, Dickey & Pierce, P.L.C.

(57) ABSTRACT

An imaging device includes an image sensing circuitry configured to receive image signals from pixels, to convert the received image signals into image data, and to output the image data. The imaging device includes a digital processing circuitry configured to process image data in synchronization with a digital clock. The digital processing circuitry includes a digital clock generator configured to generate the digital clock. The digital clock generator is configured to scatter the digital clock, in response to the image sensing circuitry converting the image signals into the image data.

20 Claims, 17 Drawing Sheets

IMAGING DEVICE AND METHOD OF OPERATING THE SAME

CROSS-REFERENCE TO RELATED APPLICATION(S)

This application claims benefit of priority under 35 U.S.C. § 119 to Korean Patent Application No. 10-2021-0048135 filed on Apr. 14, 2021 in the Korean Intellectual Property Office, the disclosure of which is incorporated herein by reference in its entirety.

BACKGROUND

Example embodiments of the present inventive concepts relate to imaging devices and methods of operating the same.

Generally, an image sensor may capture a two-dimensional or three-dimensional image of an object. An image sensor may generate an image of an object using a photoelectric conversion device responding to intensity of light reflected from the object. Recently, an image sensor using a complementary metal-oxide semiconductor (CMOS) has been widely used. A general image sensor may, however, cause pixel noise caused by influence of power fluctuations.

SUMMARY

Some example embodiments of the present inventive concepts provide an imaging device which may be less affected by power fluctuations and a method of operating the same.

According to some example embodiments of the present inventive concepts, an imaging device may include an image sensing circuitry configured to receive image signals from pixels, to convert the received image signals into image data, and to output the image data; and a digital processing circuitry configured to process image data in synchronization with a digital clock. The digital processing circuitry may include a digital clock generator configured to generate the digital clock. The digital clock generator may be configured to scatter the digital clock, in response to the image sensing circuitry converting the image signals into the image data.

According to some example embodiments of the present inventive concepts, a method of operating an imaging device may include converting an image signal into image data based on performing a counting operation until the image signal and a ramp signal equalize; and reducing consumption of digital power using a clock scattering scheme in response to the counting operation being performed.

According to some example embodiments of the present inventive concepts, an imaging device includes a pixel array having a plurality of pixels arranged in a plurality of row lines and a plurality of column lines; a row driver configured to select one row line of the plurality of row lines; an analog-to-digital conversion circuit configured to covert analog signals output by the pixel array into digital data; a digital clock generator configured to generate a transfer clock for transmitting the digital data to an image signal processor; and a timing controller configured to control timing of the pixel array, the row driver, the analog-to-digital conversion circuit, and the digital clock generator. The analog-to-digital conversion circuit may include a comparator circuit having comparators for comparing pixel signals output by the pixel array with a ramp signal, and a counter circuit having counters configured to count an output of each comparator of the comparators. The digital clock generator may be configured to scatter the transfer clock in response to a horizontal synchronization signal or a counter enable signal received from the timing controller.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Figure 1:
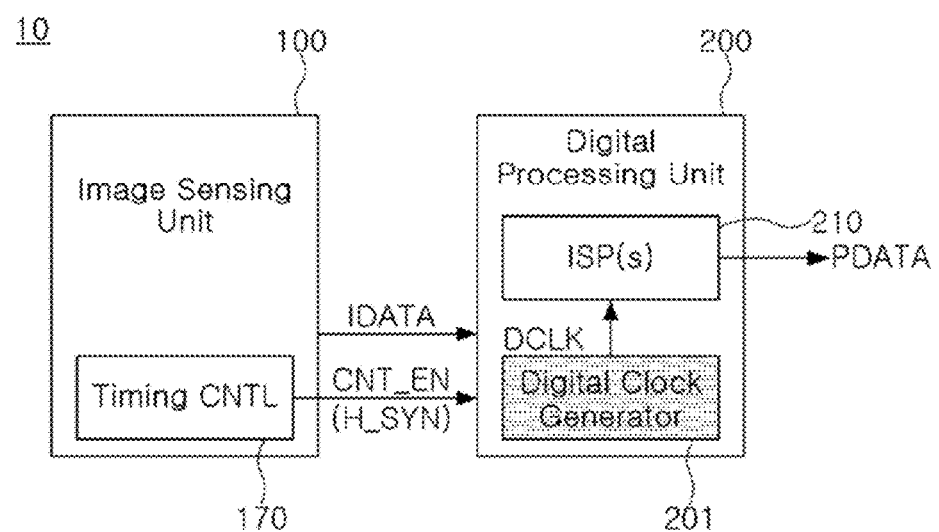
FIG. 1 is a diagram illustrating an imaging device according to some example embodiments of the present inventive concepts.

Hereinafter, some example embodiments of the present inventive concepts will be described as follows with reference to the accompanying drawings.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will further be understood that when an element is referred to as being "on" another element, it may be above or beneath or adjacent (e.g., horizontally adjacent) to the other element.

It will be understood that elements and/or properties thereof (e.g., structures, surfaces, directions, or the like), which may be referred to as being "perpendicular," "parallel," "coplanar," or the like with regard to other elements and/or properties thereof (e.g., structures, surfaces, directions, or the like) may be "perpendicular," "parallel," "coplanar," or the like or may be "substantially perpendicular," "substantially parallel," "substantially coplanar," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially coplanar" with regard to other elements and/or properties thereof will be understood to be "coplanar" with regard to the other elements and/or properties thereof within manufacturing tolerances and/or material tolerances and/or have a deviation in magnitude and/or angle from "coplanar," or the like with regard to the other elements and/or properties thereof that is equal to or less than 10% (e.g., a. tolerance of ±10%)).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIG. 1 is a diagram illustrating an imaging device 10 according to some example embodiments. Referring to FIG. 1, the imaging device 10 may include an image sensing unit 100 and a digital processing unit 200.

The image sensing unit 100, also referred to herein as an image sensing circuitry, image sensor, image sensor circuitry, or the like, may be configured to receive an image (e.g., image signals) from a pixel and/or pixels, to convert the received image (e.g., the received image signals) into a digital value (e.g., into image data, for example image data IDATA), and to output (e.g., transmit) the converted image data IDATA to the digital processing unit 200. Also, the image sensing unit 100 may include a timing controller 170 configured to generate timing for controlling internal components of the image sensing unit 100.

The digital processing unit 200 may be configured to receive the image data IDATA output by the image sensing unit 100, to process the image data IDATA to suit a human eye, and to output the processed image data PDATA to an external device (e.g., a display device). Also, the digital processing unit 200 may include and/or may be configured to implement a digital clock generator 201 and at least one image signal processor 210 (ISP(s)). A digital processing unit as described herein (e.g., digital processing unit 200) may be interchangeably referred to as digital processing circuitry. The digital clock generator 201 may include an electronic oscillator. The digital clock generator 201 may include a resonant circuit and an amplifier.

The digital clock generator 201 may be configured to generate an optimal digital clock (DCLK) according to an analog operation of the image sensing unit 100 to control fluctuations in digital power which may affect analog quality of the image sensing unit 100. For example, the digital clock generator 201 may generate a digital clock (DCLK) and/or scatter the digital clock (DCLK) according to a particular (or, alternatively, predetermined) clock timing sequence in response to a counter enable signal CNT_EN or a horizontal synchronization signal H_SYN of the timing controller 170 for performing an analog-to-digital conversion (ADC) operation of the image sensing unit 100. The particular (or, alternatively, predetermined) sequence for the digital clock DCLK may control digital power fluctuation by bypassing/gating/dividing the digital clock DCLK in the ADC operation period. The digital processing unit 200 may be configured to process the image data IDATA in synchronization with the digital clock DCLK. By controlling an output of the digital clock DCLK, pixel noise of the image sensing unit 100 may be reduced. In other words, by controlling the digital clock DCLK of a digital domain of the imaging device 10, influence of the analog domain may be reduced.

Also, while in the image sensing unit 100 senses and outputs an image, the digital clock generator 201 may generate a digital clock (DCLK) having a plurality of clock scattering sections (e.g., clock scattering periods) which may be gated or divided. Start and end points of each of the plurality of clock scattering periods may be determined by a user setting. For example, the digital clock generator 201 may output the digital clock DCLK in a reverse direction of the counter enable signal CNT_EN used for the ADC operation of the image sensing unit 100. In some example embodiments, a clock gating period, a clock division period, or a clock division ratio between entire start and end points may be determined by a user setting.

In some example embodiments, the digital clock generator 201 may scatter the digital clock DCLK, in response to, and/or concurrently with, the image sensing unit 100 converting the image signals into the image data IDATA. In some example embodiments, the digital clock generator 201 may output the digital clock DCLK with reference to a reference point (the same reference point to determine a counter activation area of the ADC operation) of the horizontal period in response to the horizontal synchronization signal H_SYN. In some example embodiments, a plurality of clock scattering periods for controlling the scattering of the digital clock DCLK may be present. Positions (cycle counts) of the start and end points of each of the plurality of clock scattering periods may be determined by a user setting. For example, each of the plurality of clock scattering periods may start at the time earlier than the counter enable signal CNT_EN with reference to the setting area of the counter enable signal CNT_EN of the ADC operation, and the end point may also be determined at the time before the counter enable signal CNT_EN is cleared. In some example embodiments, a ratio between the clock gating and the clock division may be determined by a user setting for each of the start and end points of each of the plurality of clock scattering periods.

At least one image signal processor 210 may process the image data IDATA received from the image sensing unit 100 in synchronization with the digital clock DCLK, and may output the processed data PDATA to an external entity. In some example embodiments, the image signal processor 210 may perform a depth map generation, 3D modeling, panorama generation, feature point extraction, image synthesis, or image compensation (e.g., noise reduction, resolution adjustment, brightness adjustment, blurring, sharpening, or softening) on the image data IDATA. A general imaging device may cause a noise element according to fluctuation in power of an entire chip when a voltage value of a pixel signal into a digital value in the ADC period. The imaging device 10 in some example embodiments may scatter the digital clock DCLK of the digital processing unit 200 in the ADC period of the image sensing unit 100 by a gated clock scheme or a divided clock scheme, such that influence of digital power fluctuations may be reduced.

Figure 2:
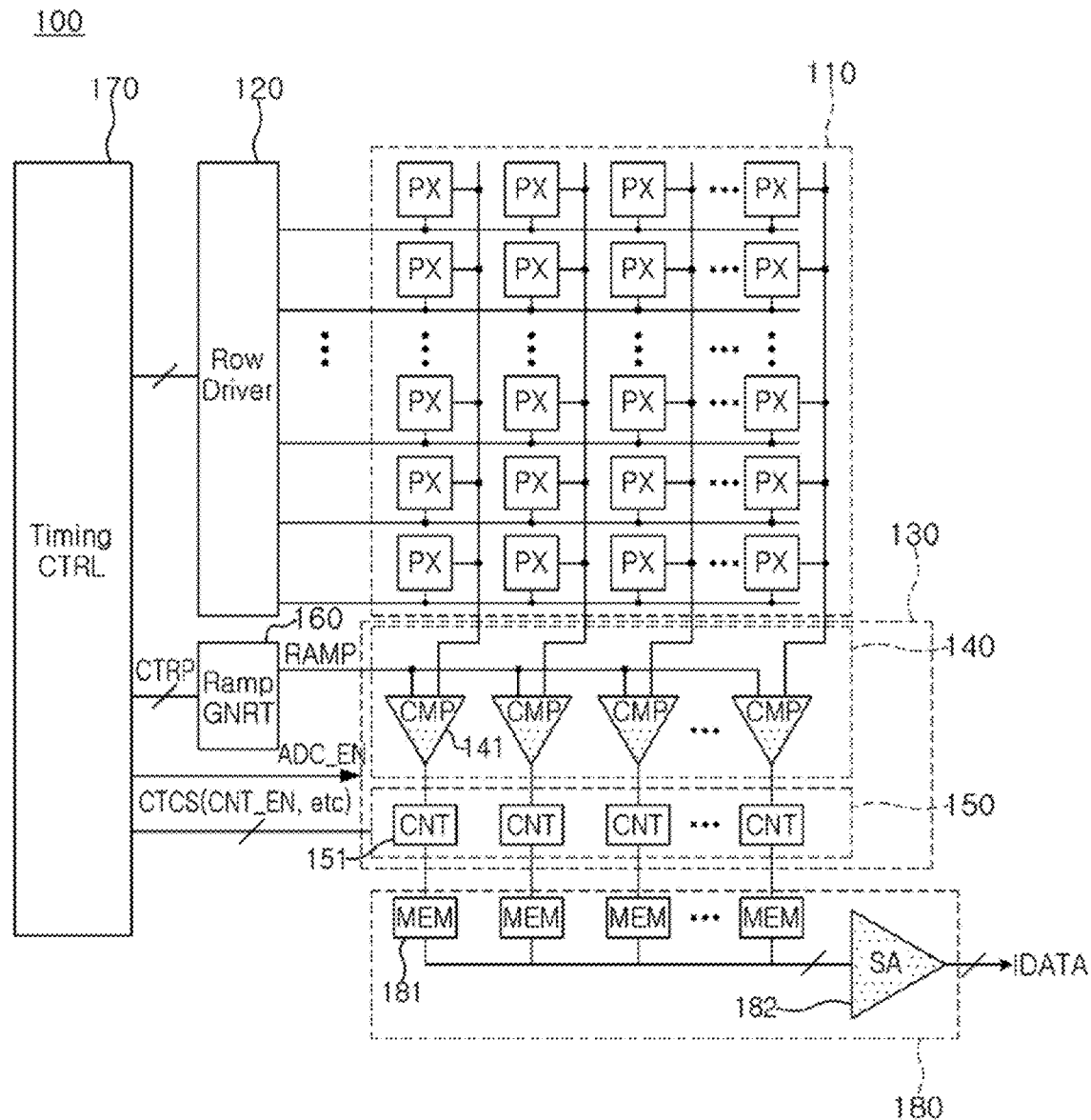
FIG. 2 is a diagram illustrating an image sensor according to some example embodiments of the present inventive concepts.

FIG. 2 is a diagram illustrating an image sensing unit 100 according to some example embodiments. Referring to FIG. 2, the image sensing unit 100 may include a pixel array 110, a row driver 120, an analog-to-digital conversion circuit 130, a ramp signal generator 160, a timing controller 170, and a buffer 180.

The pixel array 110 may include a plurality of pixels PX arranged in a matrix form, and connected to a plurality of row lines and a plurality of column lines CL. The pixels PX may be arranged in a plurality of row lines and a plurality of column lines CL. Each of the plurality of pixels may include a photosensing device. For example, the photosensing device may include a photodiode, a phototransistor, a port gate, or a pinned photodiode. Each of the plurality of pixels may include at least one photosensing device. In some example embodiments, each of the plurality of pixels may include a plurality of photosensing devices. Each of the plurality of photosensing devices may be stacked on each other.

Each of the plurality of pixels may sense light using a photosensing device and may convert light into a pixel signal which may be an electrical signal. Each of the plurality of pixels may sense light in a specific spectral region. For example, the plurality of pixels may include a red pixel for converting light in a red spectrum region into an electrical signal, a green pixel for converting light in a green spectrum region into an electrical signal, and a blue pixel for converting light in a blue spectrum region. A color filter for transmitting light in a specific spectral region may be disposed on each of the plurality of pixels.

The row driver 120 may be configured to drive the pixel array 110 in a row unit. The row driver 120 may decode a row control signal (e.g., an address signal) generated by the timing controller 170, and may select at least one of row lines included in the pixel array 110 in response to the decoded row control signal. For example, the row driver 120 may generate a row selection signal. The row driver 120 may be understood to be configured to select one row line of the plurality of row lines. Also, the pixel array 110 may output a pixel signal from a row selected by the row selection signal provided from the row driver 120. The pixel signal may include a reset signal and an image signal.

The analog-to-digital conversion circuit 130 may be configured to convert an analog pixel signal input from the pixel array 110 (e.g., received image signals from the pixels PX, also referred to as analog signals output by the pixel array 110) into digital data (e.g., image data IDATA) in response to an ADC enable signal ADC_EN, and based on comparing the image signals with a ramp signal RAMP and performing counting operations corresponding to results of the comparison. The analog-to-digital conversion circuit 130 may include a comparator circuit 140 (CDB) and a counter circuit 150 (DBS).

The comparator circuit 140 may be configured to compare a pixel signal output by a unit pixel connected to one of the column lines CL included in the pixel array 110 (e.g., compare pixel signals output by the pixel array 110) with ramp signal RAMP. The comparator circuit 140 may include a plurality of comparators 141 provided to correspond to each column. Each comparator 141 may be connected to the pixel array 110 and the ramp signal generator 160.

The comparator 141 (CMP) may be configured to receive the pixel signal and the ramp signal RAMP generated by the ramp signal generator 160, to compare the pixel signal with the ramp signal, and to output a comparison result signal to an output terminal. Also, the comparator 141 may generate a comparison result signal to which a correlated double sampling (CDS) technique is applied. Pixel signals output by the plurality of pixels may have a deviation caused by unique pixel characteristics (e.g., fixed pattern noise (FPN)) of each pixel or a deviation caused by a difference in characteristics of a logic for outputting a pixel signal from the pixel PX. The correlated double sampling technique may be of calculating a reset element (or a reset signal) and an image element (or an image signal) for each of the pixel signals and extracting a difference therebetween as a valid signal element in order to compensate for the deviation between the pixel signals. The comparator 141 may output a comparison result signal to which the correlated double sampling technique is applied.

Also, the comparator 141 may be implemented as a two-stage amplifier. For example, the comparator 141 may include a first amplifier for comparing the pixel signal with the ramp signal, and a second amplifier for amplifying an output of the first amplifier and outputting the amplified output. In some example embodiments, the first amplifier may operate based on a smaller amount of bias current in an auto-zero stage than in the comparison operation stage.

Accordingly, noise may be reduced and an input range may increase. In some example embodiments, the second amplifier may adaptively control current sources generating a bias current for each operation, and may generate a minimum bias current before and after decision. Accordingly, power supply fluctuations caused by the operation of the second amplifier may be prevented. In some example embodiments, the first amplifier may include a limiting circuit connecting an output terminal to a common node. The limiting circuit may prevent a voltage level of the common node from being lowered to be below a minimum value at which the first amplifier may normally operate, and may compensate for voltage fluctuations occurring in the output node.

Also, the comparator circuit 140 may be configured to output a decision signal (e.g., an output signal of a comparator) at different time points depending on column line groups.

The counter circuit 150 may include a plurality of counters. Each of the plurality of counters 151 and CNT may be connected to an output terminal of the comparators 141 and may be configured to count based on an output of each comparator 141 (e.g., perform counting operations corresponding to the results of the comparison performed by the comparator 141). The counters 151 may be configured to count an output of each comparator 141 of the comparators 141. The counter control signal CTCS may include a counter enable signal CNT_EN, a counter clock signal, a counter reset signal for controlling a reset operation of the plurality of counters 151, and an inversion signal for inverting internal bits of each of the plurality of counters. The counter circuit 150 may output the comparison result signal as digital data by counting the comparison result signal according to the counter clock signal. In some example embodiments, each of the plurality of counters may be enabled by a counter enable signal CNT_EN (see FIG. 1).

The counter 151 (CNT) may include an up/down counter or a bit-wise counter. In some example embodiments, the bit-wise counter may perform an operation similar to that of the up/down counter. For example, the bit-wise counter may perform a function of performing only up-counting and a function of inverting all bits in the counter to be 1's complements when a certain signal is input. The bit-wise counter may perform a reset count, and may invert and convert the same into 1's complements, a negative value.

The ramp signal generator 160 may be configured to generate a ramp signal (or ADC reference voltage). The ramp signal generator 160 may operate based on the ramp control signal CTRP provided by the timing controller 170. The ramp control signal CTRP may include a ramp enable signal, and a mode signal. When the ramp enable signal is enabled, the ramp signal generator 160 may generate a ramp signal RAMP having a slope determined based on the mode signal.

The timing controller 170 may be configured to, by outputting a control signal or a clock signal to each of the row driver 120, the analog-to-digital conversion circuit 130, and the ramp signal generator 160, control the operations or timings of the row driver 120, the analog-to-digital conversion circuit 130, and the ramp signal generator 160.

In some example embodiments, the timing controller 170 may transmit information on the ADC operation period of the image sensing unit 100 to the digital processing unit 200 (see FIG. 1). For example, the timing controller 170 may transmit the ADC enable signal ADC_EN, the horizontal synchronization signal H_SYN, or the counter enable signal CNT_EN to the digital processing unit 200. The timing controller 170 may be configured to generate at least the counter enable signal CNT_EN that is related to the counting operations performed by the plurality of counters 151.

Also, the timing controller 170 may generate switching control signals provided to the comparator circuit 140 to configure decision speeds to be different depending on the column line group.

The buffer 180 may be configured to temporarily store digital data output by the analog-to-digital conversion circuit 130 and to amplify and output the digital data. The buffer 180 may include a column memory block 181 (MEM) and a sense amplifier 182 (SA).

The column memory block 181 (MEM) may include a plurality of memories. Each of the plurality of memories may temporarily store digital data output by each of the plurality of counters 151 and may output the digital data to the sense amplifier 182.

The sense amplifier 182 (SA) may be configured to sense and amplify digital data output by the plurality of memories. The sense amplifier 182 may output the amplified digital data as image data IDATA.

Hereinafter, control of scattering the digital clock (DCLK) will be described in greater detail according to some example embodiments.

Figure 3:
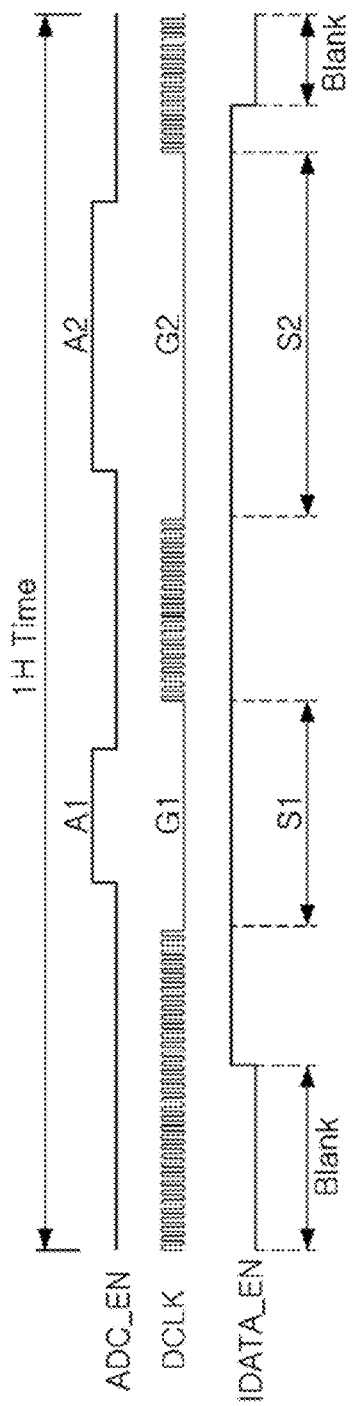
FIG. 3 is a diagram illustrating timing of a digital clock of a gated clock scheme according to some example embodiments of the present inventive concepts.

FIG. 3 is a diagram illustrating timing of a digital clock DCLK of a gated clock scheme according to some example embodiments. As illustrated in FIG. 3, the ADC enable signal ADC_EN may have a high level in the first ADC period A1 and the second ADC period A2. In the first ADC period A1, a reset voltage may be converted, and in the second ADC period A2, a pixel voltage may be converted. Accordingly, the image sensing unit 100 may be configured to perform a first analog-to-digital conversion (ADC) operation corresponding to a reset voltage (e.g., in a period corresponding to the first ADC period A1), and perform a second ADC operation corresponding to a pixel voltage (e.g., in a period corresponding to the second ADC period A2). In some example embodiments, the second ADC period A2 may be longer than the first ADC period A1.

The digital clock DCLK may be gated before/after each of the first and second ADC periods A1 and A2. For example, the digital clock DCLK may include a first clock gating period G1 and a second clock gating period G2. The first clock gating period G1 may include the first ADC period A1, and the second clock gating period G2 may include the second ADC period A2. The digital clock DCLK may be normally output in a period other than the first and second clock gating periods G1 and G2. The digital clock generator 201 may be understood to be configured to gate the digital clock DCLK in an entire or partial period of each of the first ADC period A1 corresponding to the first ADC operation performed by the image sensing unit 100, and the second ADC period A2 corresponding to the second ADC operation performed by the image sensing unit 100.

In some example embodiments, the digital clock DCLK may be output according to a particular (or, alternatively, predetermined) timing in response to the ADC enable signal ADC_EN. For example, the digital clock DCLK may determine a gating period in response to a counter enable signal for the ADC operation.

As illustrated in FIG. 3, an image data enable signal IDATA_EN may have a high level in a particular (or, alternatively, predetermined) period to indicate that the image data IDATA received from the image signal processor 210 of the digital processing unit 200 is valid. In some example embodiments, the image data enable signal IDATA_EN may be generated by the timing controller 170 (see FIG. 1). In some example embodiments, the image data enable signal IDATA_EN may be generated in the digital processing unit 200 (see FIG. 1) in response to the ADC enable signal ADC_EN. In the blank period illustrated in FIG. 3, the image sensing unit 100 may not perform signal reading (see FIG. 1). The image data enable signal IDATA_EN may have a first stall period S1 and a second stall period S2. The first stall period S1 may correspond to the first clock gating period G1, and the second stall period S2 may correspond to the second clock gating period G2. In some example embodiments, in the first and second stall periods S1 and S2, there may be no output of the converted image data IDATA.

In some example embodiments, while the image data enable signal IDATA_EN has a high level, the processed data PDATA (see FIG. 1) may be output to an external entity in a period other than the first and second stall periods S1 and S2.

The method of controlling the digital clock (DCLK) in some example embodiments may, by gating the clock in a period corresponding to the ADC operation, reduce the digital influence in the ADC operation.

The converted digital data IDATA of the image sensing unit 100 may be output to a plurality of image signal processors (ISPs) connected to each other in series.

Figure 4A:
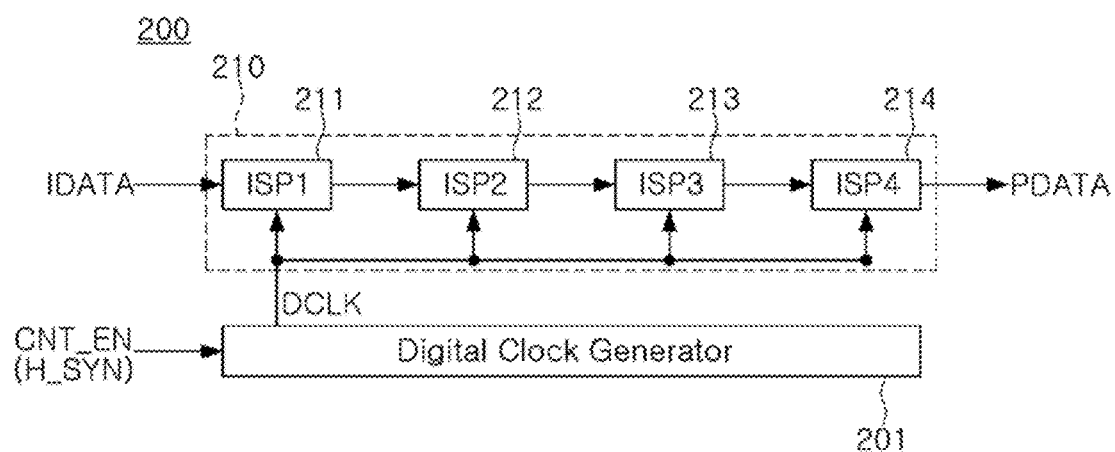
FIGS. 4A and 4B are diagrams illustrating a digital processing unit implemented by a plurality of ISPs connected to each other in series and timing of a digital clock thereof according to some example embodiments of the present inventive concepts.
Figure 4B:
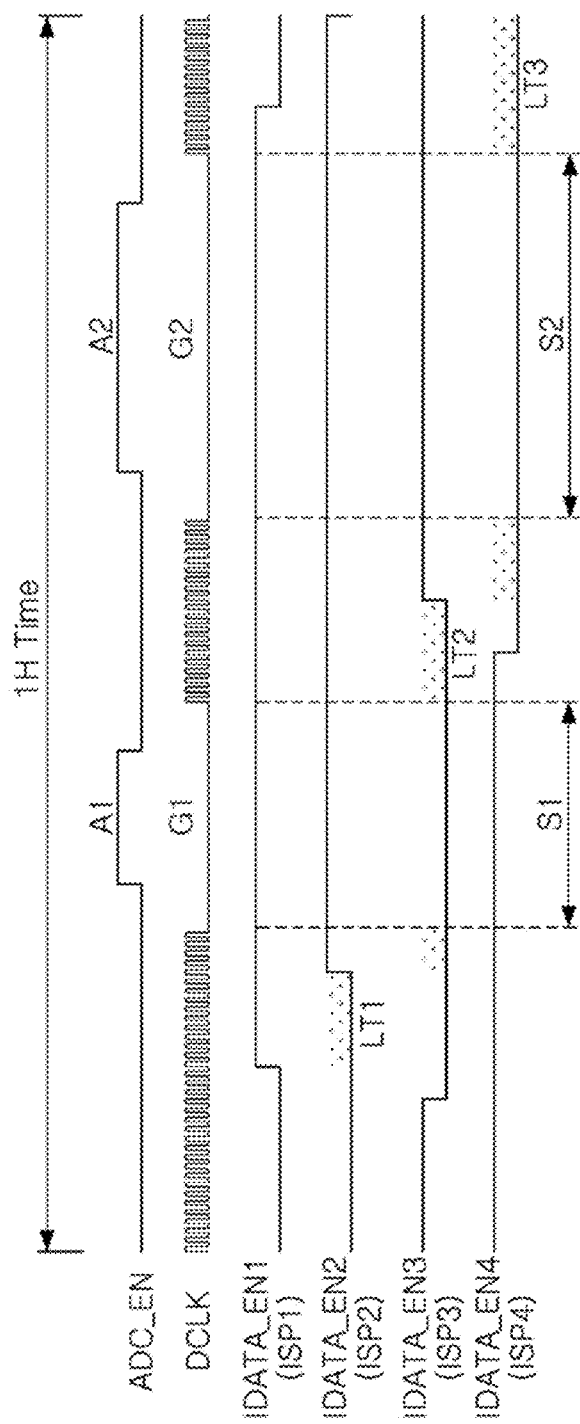

FIGS. 4A and 4B are diagrams illustrating a digital processing unit 200 implemented by a plurality of ISPs connected to each other in series and timing of a digital clock thereof according to some example embodiments. Referring to FIG. 4B, the image data IDATA may be digitally processed by four ISPs 211 to 214 (ISP1 to ISP4) connected to each other in series in synchronization with the digital clock DCLK.

In FIG. 4B, the image data enable signal IDATA_EN corresponding to each of the ISPs 211 to 214 (e.g., ISPs 211, 212, 213, and 214) may have common first and second stall periods S1 and S2. In some example embodiments, each of the ISPs 211 to 214 may process the received data with appropriate latencies LT1 to LT3 in a period other than the first and second stall periods S1 and S2. Restated, each of the ISPs 211 to 214 may not process data processed in the first and second stall periods S1 and S2 that correspond to the first and second ADC operations, respectively. For example, the second ISP 212 may receive data processed by the first ISP 211 and may perform a particular (or, alternatively, predetermined) processing operation on the received data. In some example embodiments, the image data enable signal IDATA_EN2 of the second ISP 212 may have a higher level after the first latency LT1, later than the image data enable signal IDATA_EN1 of the first ISP 211.

When the blank period in the output period for the processed data PDATA is not sufficient, a divided clock scheme may be applied.

Figure 5:
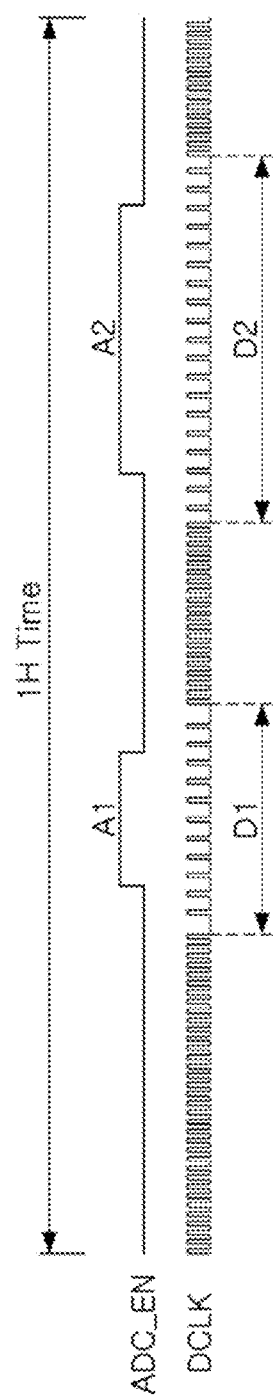
FIG. 5 is a diagram illustrating timing of a digital clock of a divided clock scheme according to some example embodiments of the present inventive concepts.

FIG. 5 is a diagram illustrating timing of a digital clock DCLK of a divided clock scheme according to some example embodiments. Referring to FIG. 5, the timing of the digital clock DCLK may have a first clock division period D1 corresponding to the first ADC period A1 and a second clock division period D2 corresponding to the second ADC period A2. In other words, the digital clock DCLK may be divided in the first ADC period A1 and the second ADC period A2. The digital clock generator 201 may be understood to be configured to divide the digital clock DCLK in an entire or partial period of each of the first ADC period A1 corresponding to the first ADC operation performed by the image sensing unit 100 and the second ADC period A2 corresponding to the second ADC operation performed by the image sensing unit 100.

In some example embodiments, when the clock division ratio is determined, the digital clock generator 201 may gate an n−1 number of clocks from a start point of the clock division period, and may allow a single clock to bypass (to pass). Also, the clock may be by passed from an end point of the divided clock.

The method of controlling the digital clock (DCLK) according to some example embodiments may, by dividing the clock in the period corresponding to the ADC operation, secure the blank period and may reduce the digital influence in the ADC operation.

The gated clock scheme and the divided clock scheme according to some example embodiments may be applied only to a portion of the ADC period.

FIGS. 6A, 6B, 6C, and 6D are diagrams illustrating timing of a digital clock DCLK applying digital clock scattering to a portion of an ADC according to some example embodiments.

Figure 6A:
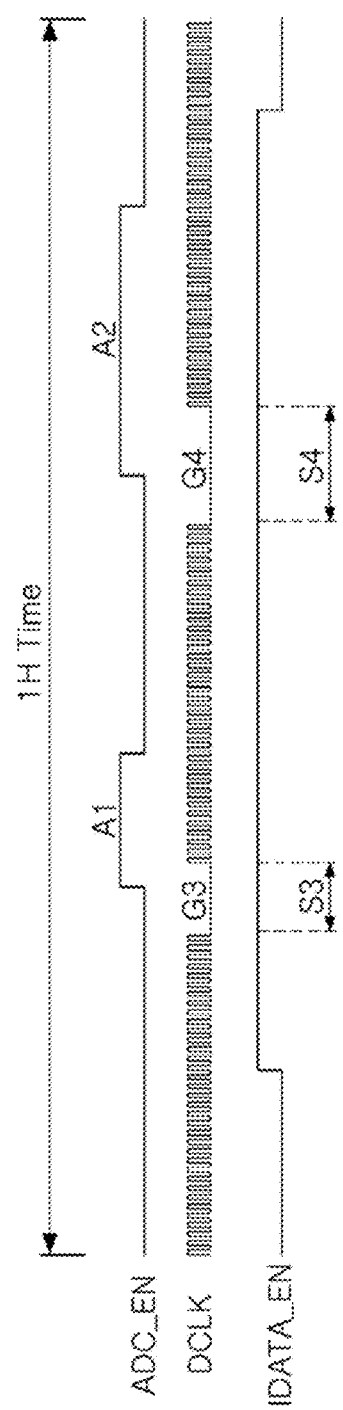
FIGS. 6A, 6B, 6C, and 6D are diagrams illustrating timing of a digital clock applying digital clock scattering to a portion of an ADC period according to some example embodiments of the present inventive concepts.

Referring to FIG. 6A, a third clock gating period G3 (e.g., in a stall period S4) corresponding to a portion of the first ADC period A1 may be present, and a fourth clock gating period G4 (e.g., in a stall period S4) corresponding to a portion of the second ADC period A2 may be present. For example, a period corresponding to the first 25% of the first ADC period A1 may be included in the third clock gating period G3, and a period corresponding to the first 25% of the second ADC period A2 may be included in the fourth clock gating period G4. The period corresponding to the first 25% may be a dark area sensitive to image quality characteristics. Accordingly, as shown in FIG. 6A, the digital clock generator 201 may be configured to gate the digital clock DCLK in a partial period of each of the first ADC period A1 and the second ADC period A2.

Figure 6B:
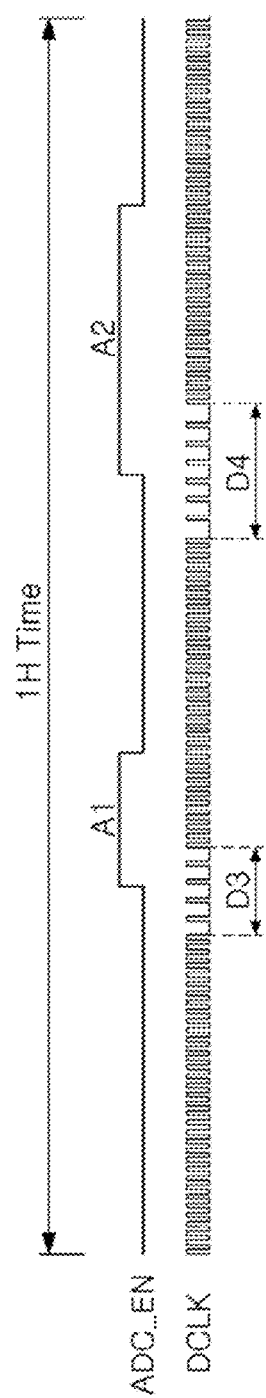

Referring to FIG. 6B, a third clock division period D3 corresponding to a portion of the first ADC period A1 may be present, and a fourth clock division period D4 corresponding to a portion of the second ADC period A2 may be present. For example, the period corresponding to the first 25% of the first ADC period A1 may be included in the third clock division period D3, and the period corresponding to the first 25% of the second ADC period A2 may be included in the fourth clock division period D4. Accordingly, as shown in FIG. 6B, the digital clock generator 201 may be configured to divide the digital clock DCLK in a partial period of each of the first ADC period A1 and the second ADC period A2.

Figure 6C:
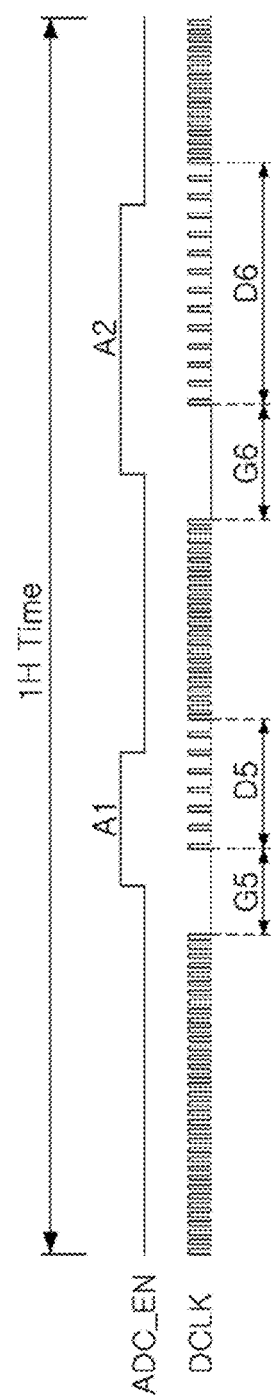

Referring to FIG. 6C, a fifth clock gating period G5 and a fifth clock division period D5 corresponding to the first ADC period A1 may be present, and a sixth clock gating period G6 and a sixth clock division period D6 corresponding to the second ADC period A2 may be present. For example, the period corresponding to the first 25% of the first ADC period A1 may be the fifth clock gating period G5, and the period corresponding to the other 75% may be the fifth clock division period D5. Similarly, the period corresponding to the first 25% of the second ADC period A2 may be the sixth clock gating period G6, and the period corresponding to the other 75% may be the sixth clock division period D6. As shown in FIG. 6C, the digital clock generator 201 may be understood to be configured to gate (e.g., G5, G6) the digital clock DCLK in a partial period of each of the first ADC period A1 corresponding to the first ADC operation performed by the image sensing unit 100 and the second ADC period A2 corresponding to the second ADC operation performed by the image sensing unit 100 and divide the digital clock DCLK (e.g., D5, D6) in another period of each of the first ADC period A1 and the second ADC period A2.

Figure 6D:
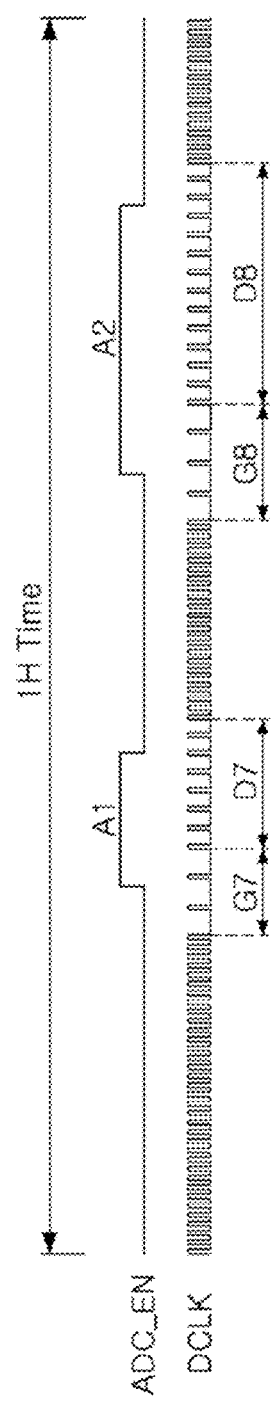

Referring to FIG. 6D, two clock division periods G7 and D7 corresponding to the first ADC period A1 may be present, and two clock division periods G8 and D8 corresponding to the second ADC period A2 may be present. For example, the period corresponding to the first 25% of the first ADC period A1 may be the clock division period G7 according to the first clock division ratio, and the period corresponding to the other 75% may be the clock division period D7 according to the second clock division ratio. The second clock division ratio may be greater than the first clock division ratio. However, some example embodiments thereof is not limited thereto.

Similarly, the period corresponding to the first 25% of the second ADC period A1 may be the clock division period G8 according to the first clock division ratio, and the period corresponding to the other 75% is the second clock division ratio may be the clock division period D8 according to the second clock division ratio.

The ratio of the clock gating period or the clock division period in some example embodiments is not limited to the above example.

Referring to FIGS. 6C to 6D, in some example embodiments, the digital clock generator 201 may be configured to scatter the digital clock DCLK in a first stall period (e.g., S1 as shown in FIGS. 3 and 4B) that includes a first ADC period A1 corresponding to the first ADC operation performed by the image sensing unit 100 and a second stall period (e.g., S2 as shown in FIGS. 3 and 4B) including a second ADC period A2 corresponding to the second ADC operation performed by the image sensing unit 100. As shown in FIG. 6C, each of the first ADC period A1 and the second ADC period A2 may be divided into a plurality of clock scattering periods, and in the plurality of clock scattering periods, the digital clock DCLK may be scattered by different schemes (e.g., gating G5, G6 or dividing D5, D6). As shown in FIG. 6D, each of the first ADC period A1 and the second ADC period A2 may be divided into a plurality of clock scattering periods, and in the plurality of clock scattering periods, the digital clock DCLK may be divided according to different clock division ratios.

Figure 7:
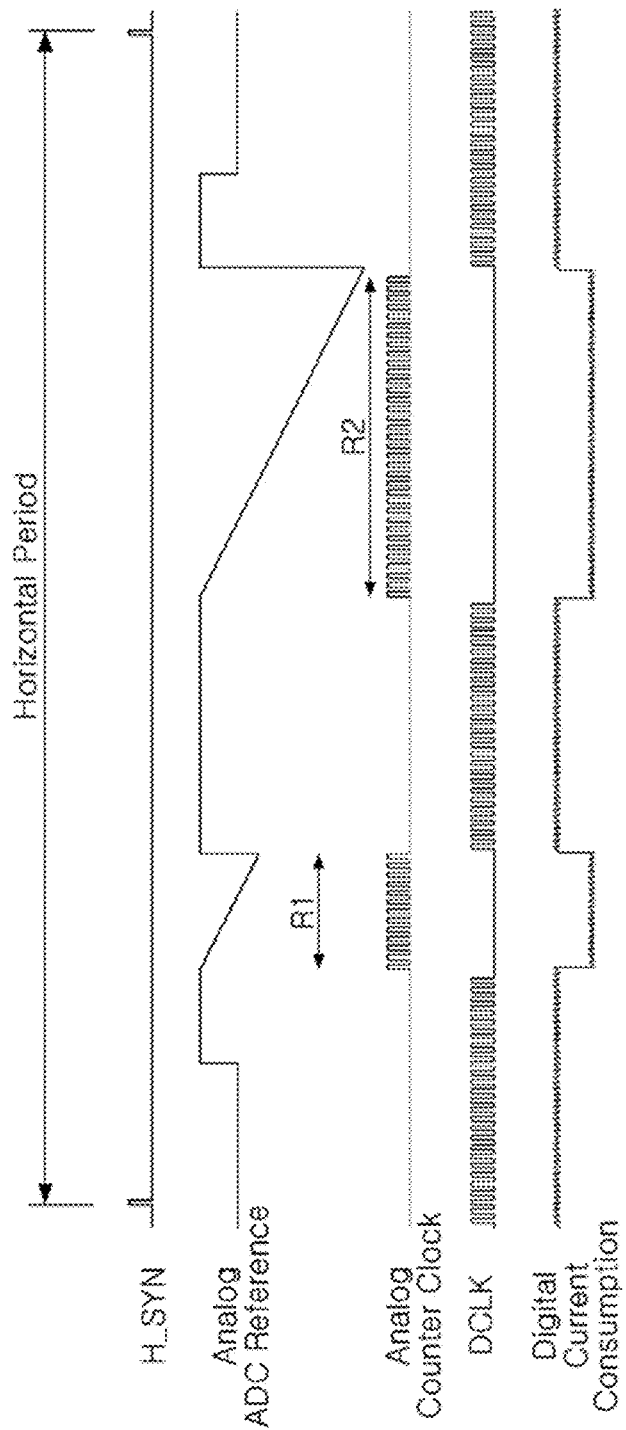
FIG. 7 is a diagram illustrating consumption of a digital current of an imaging device according to some example embodiments of the present inventive concepts.

FIG. 7 is a diagram illustrating consumption of a digital current of an imaging device 10 according to some example embodiments. Referring to FIG. 7, during a horizontal period, an analog counter clock may be enabled in a first ramp period R1 and a second ramp period R2 according to a change in an ADC reference voltage. A first counting operation corresponding to a reset voltage may be performed in the first ramp period R1, and a second counting operation corresponding to a pixel voltage may be performed in the second ramp period R2.

The digital clock DCLK may be output in response to the horizontal synchronization signal H_SYN. Also, the digital clock DCLK may not be output in response to the counter clock. For example, the digital clock DCLK may be gated in periods corresponding to the first and second ramp periods R1 and R2. In some example embodiments, the consumption of a digital current consumed by the digital processing unit 200 may be significantly reduced in the ramp periods R1 and R2. Accordingly, the counting operation for the ADC operation may be less affected by the digital power.

Figure 8:
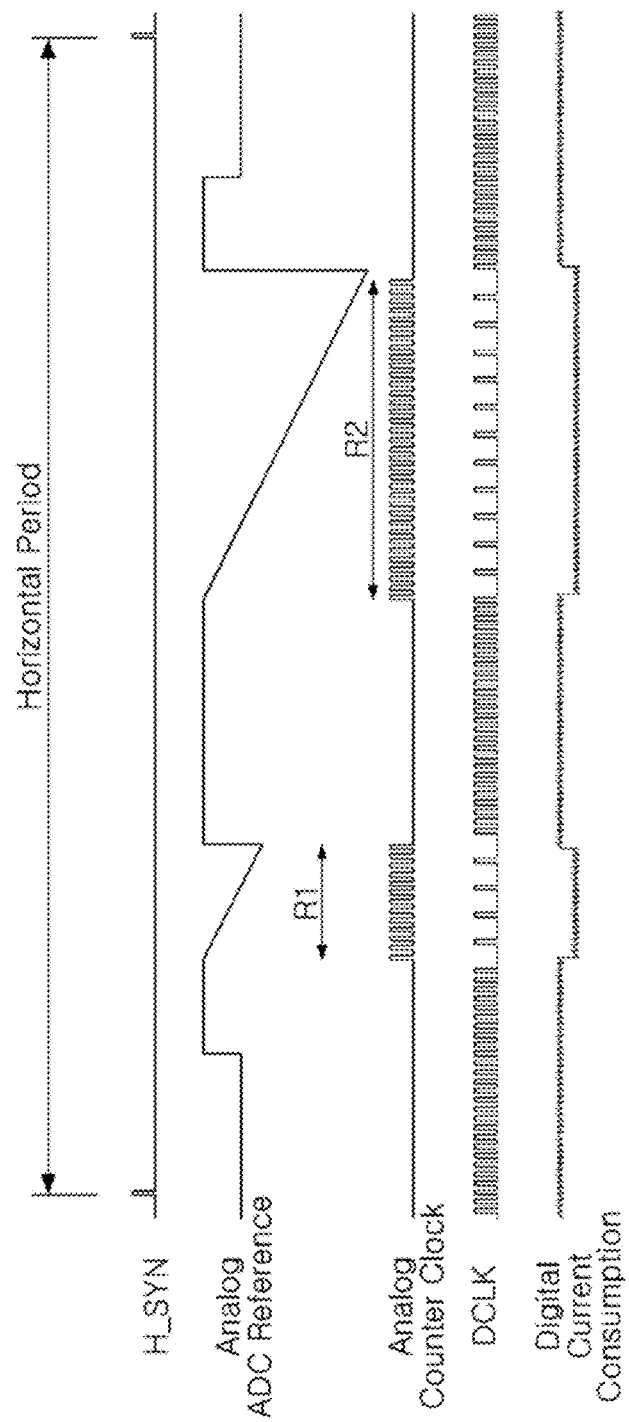
FIG. 8 is a diagram illustrating consumption of a digital current of an imaging device according to some example embodiments of the present inventive concepts.

FIG. 8 is a diagram illustrating consumption of a digital current of an imaging device 10 according to some example embodiments. Referring to FIG. 8, the digital clock DCLK may be output in response to the horizontal synchronization signal H_SYN and may not be output in response to the counter clock. For example, the digital clock DCLK may be divided in periods corresponding to the first and second ramp periods R1 and R2. In some example embodiments, the consumption of the digital current consumed by the digital processing unit 200 may be reduced in the ramp periods R1 and R2.

In the imaging device 10 in FIGS. 1 to 8, the control of scattering of the digital clock DCLK used by the digital processing unit 200 is illustrated. However, some example embodiments thereof is not limited thereto. Some example embodiments may also be applicable to the control of scattering of the digital clock used in the image sensing unit.

Figure 9A:
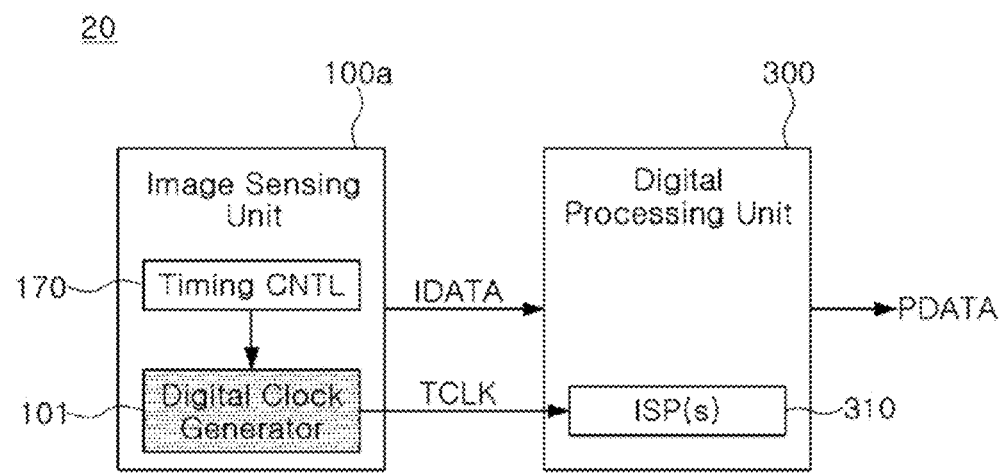
FIG. 9A is a diagram illustrating an imaging device according to some example embodiments of the present inventive concepts.

FIG. 9A is a diagram illustrating an imaging device 20 according to some example embodiments. Referring to FIG. 9A, the imaging device 20 may include an image sensing unit 100a and a digital processing unit 300.

The image sensing unit 100a may include a digital clock generator 101 and a timing controller 170. The image sensing unit 100a may include at least one of a pixel array 110, a row driver 120, an analog-to-digital conversion circuit 130, a ramp signal generator 160, a timing controller 170, and/or a buffer 180 as described with reference to at least FIG. 2. The digital clock generator 101 may be configured to generate a transfer clock TCLK for transmitting digital data (e.g., IDATA) to an image signal processor (e.g., image signal processor 310). The timing controller 170 may be configured to control timing of the pixel array 110, the row driver 120, the analog-to-digital conversion circuit 130, and the digital clock generator 101. The image sensing unit 100a may synchronize the image data IDATA to the transfer clock TCLK and may output the data to the digital processing unit 300. The digital clock generator 101 may be configured to scatter the transfer clock TCLK in response to a horizontal synchronization signal H_SYN or a counter enable signal CNT_EN received from the timing controller 170. The digital clock generator 101 may be configured to gate or divide the transfer clock TCLK in response to the counters 151 being enabled. The scattering of the transfer clock TCLK may be determined according to a user setting. The transfer clock TCLK may be scattered based on a gated clock scheme or a divided clock scheme. Such scattering may be based on the gated clock scheme or the divided clock scheme in a partial or entire period in which the counters 151 are enabled.

The digital clock generator 101 may generate a clock-scattered (gated/divided) transfer clock TCLK in an analog operation (e.g., the ADC operation) of the image sensing unit 100a. The clock-scattered transfer clock TCLK may be similar to the gated clock or the divided clock described with reference to FIGS. 1 to 8.

The digital processing unit 300 may include at least one image signal processor 310 (ISP(s)). The image signal processor 310 may perform a processing operation on the received image data IDATA in synchronization with the transfer clock TCLK. The plurality of ISPs of the digital processing unit according to some example embodiments may be connected in parallel.

Figure 9B:
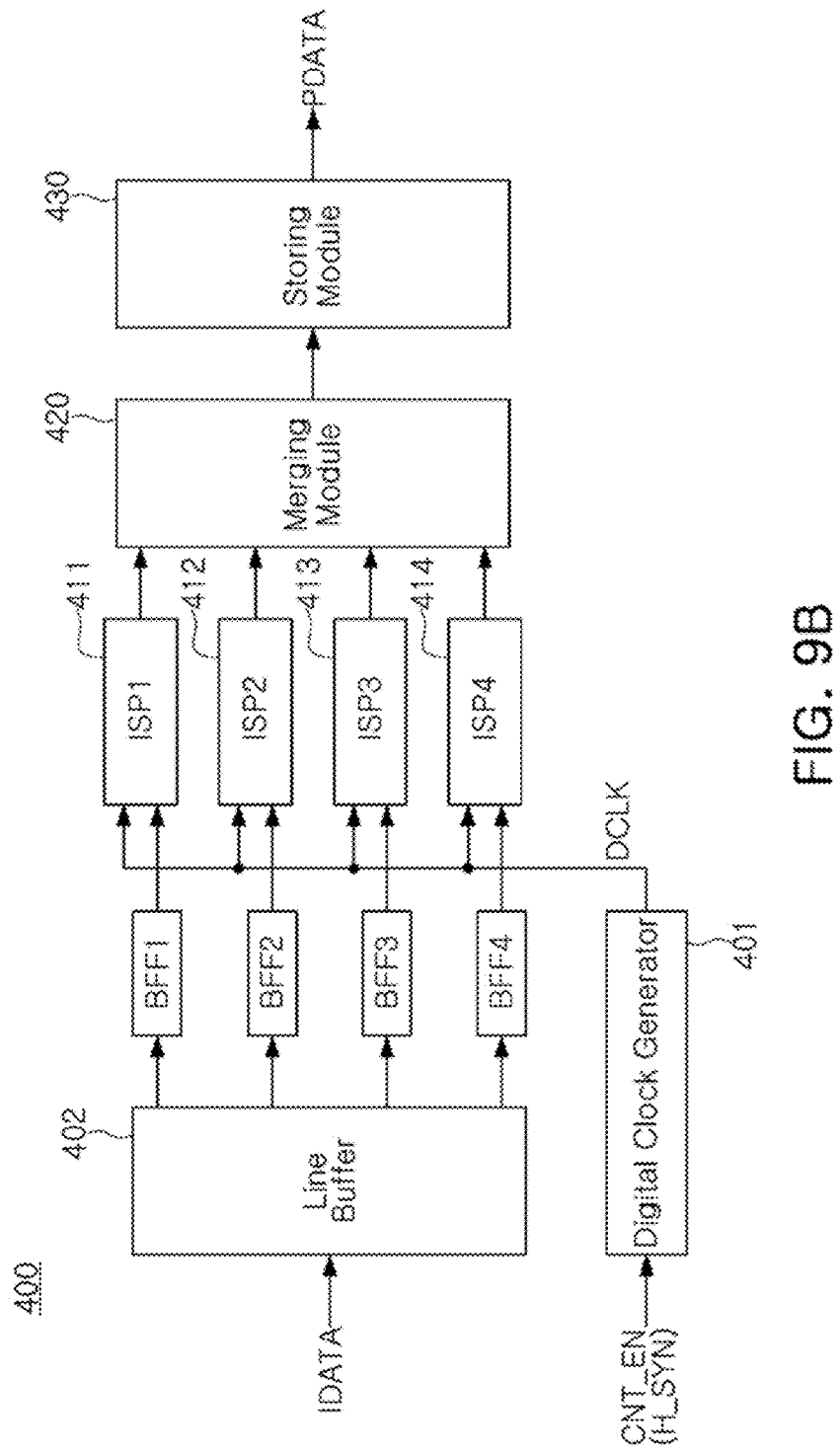
FIG. 9B is a diagram illustrating a digital processing unit implemented by a plurality of ISPs connected to each other in parallel according to some example embodiments of the present inventive concepts.

FIG. 9B is a diagram illustrating a digital processing unit 400 according to some example embodiments. Referring to FIG. 9B, the digital processing unit 400 may include a digital clock generator 401, a line buffer 402, a plurality of ISPs 411 to 414 (e.g., ISPs 411, 412, 413, and 414), a merging module 420, and a storing module 430. As described with reference to FIGS. 1 to 8, the digital clock generator 401 may be configured to scatter the digital clock DCLK in the ADC period of the image sensing unit.

The line buffer 402 may be configured to store image data obtained from the image sensing unit in line unit. At least a portion of the data stored in the line buffer 402 may be associated data of a plurality of photodiodes arranged according to a two-dimensional arrangement of the image sensing unit. The plurality of photodiodes may be disposed in the image sensing unit based on pixels disposed two-dimensionally along two axes perpendicular to each other. A line may be a group of pixels disposed in the image sensing unit, and may correspond to a group of pixels disposed along one of two axes. In some example embodiments, data stored in the line buffer 402 may be divided into a plurality of pieces. The plurality of divided data may be transmitted to a corresponding ISP via a corresponding buffer.

Each of the plurality of ISPs 411 to 414 may be configured to perform a digital processing operation on data stored from the buffer in synchronization with the digital clock DCLK. The digital processing operation may include color interpolation (CI), gamma correction, edge enhancement (EE), and noise reduction (NR). The merging module 420 may be configured to merge partial or entire data output by the plurality of ISPs 411 to 414. The storing module 430 may be configured to store the merged data from the merging module 420. The stored data may be frame data corresponding to the image data acquired by the image sensing unit. An application processor (AP) may process the frame data based on an application in execution. For example, the AP may generate an image file or a video file of a designated format (e.g., JPEG format or MPEG format) based on the identified frame data.

Figure 10:
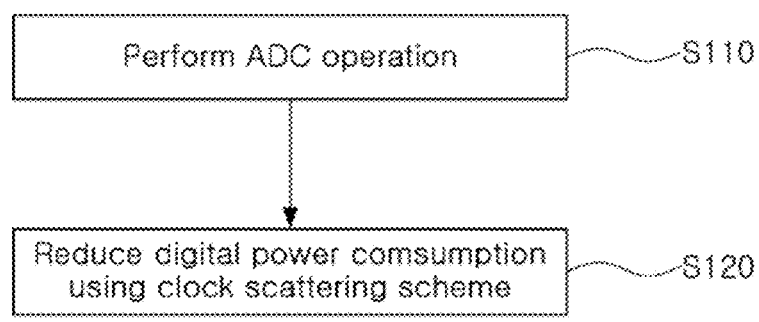
FIG. 10 is a flowchart illustrating a method of operating an imaging device according to some example embodiments of the present inventive concepts.

FIG. 10 is a flowchart illustrating a method of operating an imaging device according to some example embodiments. The method shown in FIG. 10 may be performed with regard to an imaging device 10 according to any of the example embodiments. Referring to FIGS. 1 to 10, the method of operating the imaging device 10 may be performed as below.

The image sensing unit 100 may perform an analog-to-digital conversion operation (S110), which may include converting an image signal into image data (e.g., IDATA) based on performing a counting operation (e.g., by counters 151) until the image signal and a ramp signal RAMP equalize. While the analog-to-digital conversion operation is performed (e.g., concurrently with the counting operation being performed and/or in response to the counting operation being performed), the digital processing unit 200 or the image sensing unit 100 may reduce digital power consumption using a clock scattering scheme (S120). The clock scattering scheme may be implemented as a gated clock scheme or a divided clock scheme. The clock scattering scheme may include gating or dividing a digital clock DCLK used in an image sensing unit 100 of the imaging device 10 or a digital processing unit 200 of the imaging device 10.

In some example embodiments, the clock scattering scheme may gate the clock or may divide the clock in the entire or partial period of the ADC period. For example, the converting into the image data at S110 may include forming a first analog-to-digital (ADC) operation corresponding to a reset voltage, and performing a second ADC operation corresponding to a pixel voltage, and the reducing consumption of the digital power may include gating or dividing the digital clock in an entire or partial period of a first ADC period corresponding to the first ADC operation and a second ADC period corresponding to the second ADC operation. For example, a clock may be gated or a divided clock may be output in a portion of the ADC period, about the first 25% period, which may be a dark area sensitive to image quality characteristics, for example. Also, the clock may be gated in the first 25% period of the ADC period, and the divided clock may be output in a later 75% period.

Referring to FIGS. 4A-4B and 10, the method may include transmitting the image data IDATA to image signal processors (e.g., ISPs 211 to 214) connected to each other in series. Each of the image signal processors (e.g., ISPs 211 to 214) may not process data processed in a first stall period S1 corresponding to the first ADC operation and a second stall period S2 corresponding to the second ADC operation.

In the clock scattering scheme used at S120, a clock gating period, a clock division period, or a clock division ratio is determined based on a user setting.

In some example embodiments, the ADC period may be determined as a plurality of clock scattering periods. In some example embodiments, the determined clock scattering periods may overlap each other. In some example embodiments, a priority may be provided to each of the periods by a user. When the periods overlap, a clock corresponding to a priority may be output. In some example embodiments, start points of the later periods may be the same or ahead of the end points of the earlier periods time-wise.

Figure 11:
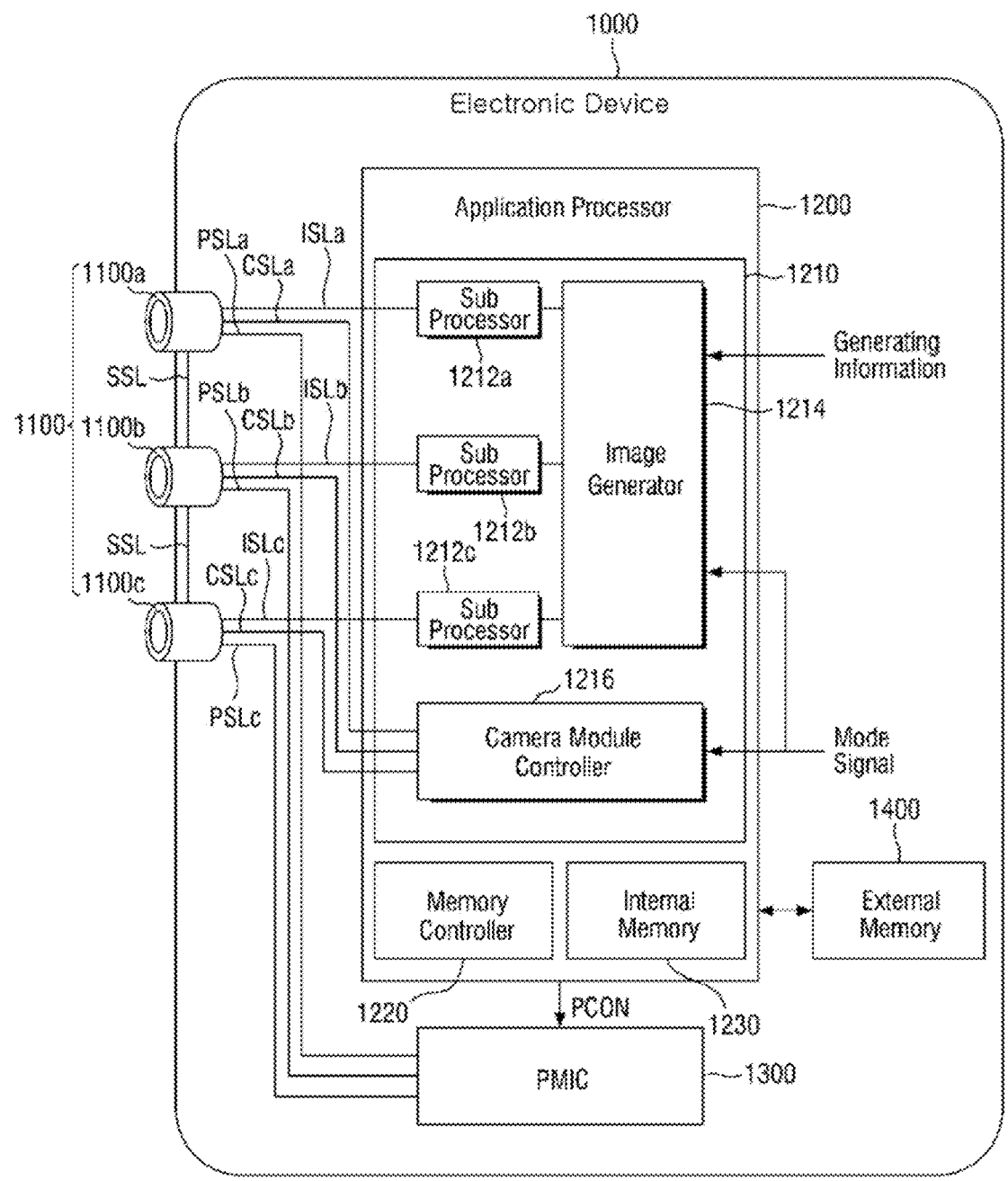
FIG. 11 is a diagram illustrating an electronic device having a multi-camera module.

FIG. 11 is a diagram illustrating an electronic device having a multi-camera module. Referring to FIG. 11, an electronic device 1000 may include a camera module group 1100, an application processor 1200, a PMIC 1300, and an external memory 1400.

The camera module group 1100 may include a plurality of camera modules 1100a, 1100b, and 1100c. As used herein, a camera module may be interchangeably referred to as a "camera," a "camera device," or the like. Although the drawing illustrates some example embodiments in which three camera modules 1100a, 1100b, and 1100c are disposed, some example embodiments thereof is not limited thereto. In some example embodiments, the camera module group 1100 may be modified to include only two camera modules. Also, in some example embodiments, the camera module group 1100 may be modified to include n (n is a natural number equal to or greater than 4) camera modules.

Figure 12:
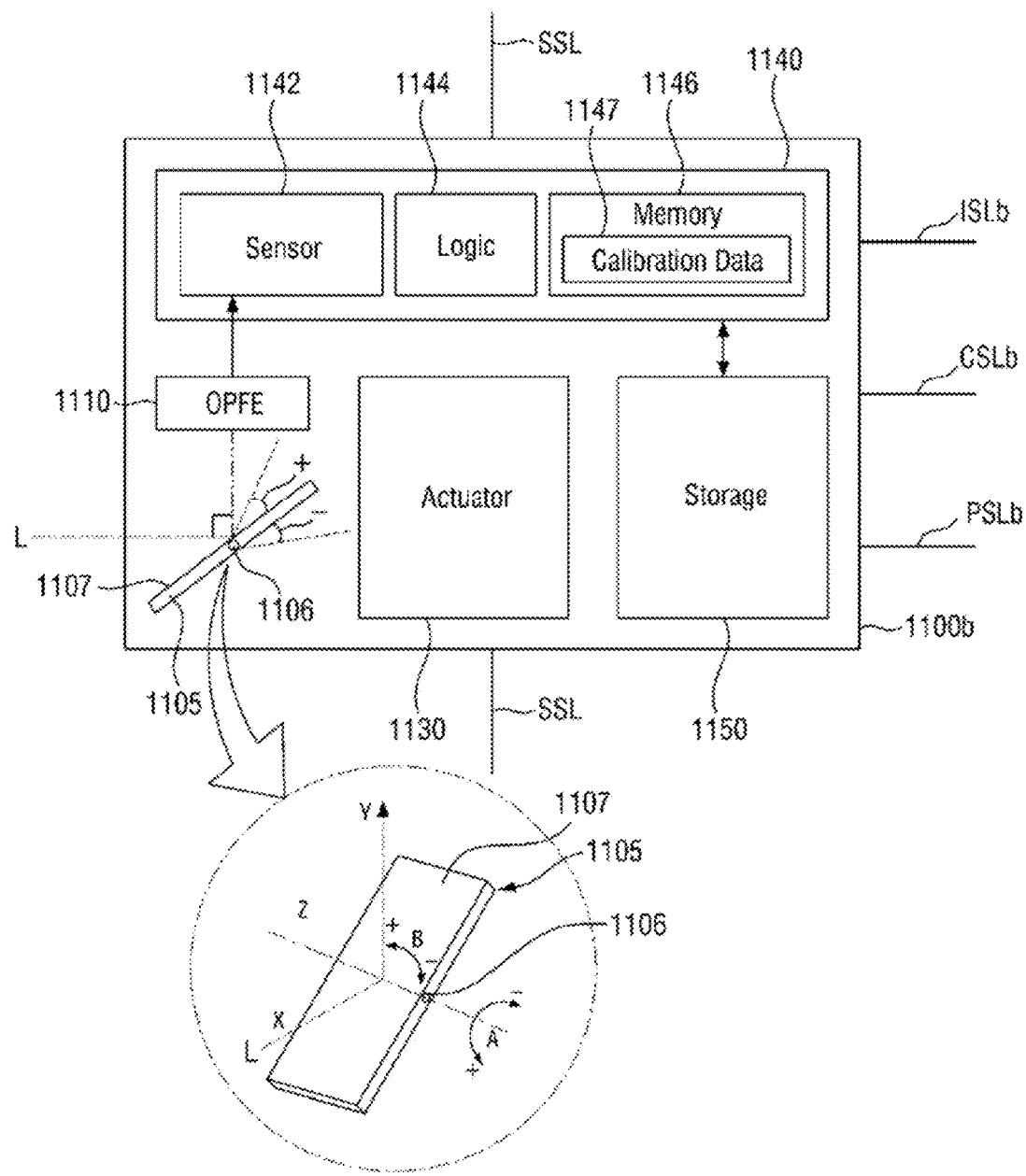
FIG. 12 is a diagram illustrating a specific configuration of the camera module illustrated in FIG. 11.

FIG. 12 is a diagram illustrating a specific configuration of the camera module illustrated in FIG. 11. The description below may be also applied to other camera modules 1100a and 1100b in example embodiments. Referring to FIG. 12, the camera module 1100b may include a prism 1105, an optical path folding element (OPFE) 1110, an actuator 1130, an image sensing device 1140, and a storage device 1150.

The prism 1105 may include the reflective surface 1107 of a light reflecting material and may change a path of light L incident from the outside.

In example embodiments, the prism 1105 may change a path of light L incident in the first direction X to travel in the second direction Y perpendicular to the first direction X. Also, the prism 1105 may rotate the reflective surface 1107 of a light reflecting material in the direction A around the central axis 1106, or may rotate the central axis 1106 in the direction B to change the path of the light L incident in the first direction X to travel in the vertical second direction Y. In some example embodiments, the OPFE 1110 may also move in a third direction Z perpendicular to the first direction X and the third direction Z perpendicular to the second direction Y.

In some example embodiments, as illustrated, a maximum rotation angle of the prism 1105 in the positive (+) A direction may be 15 degrees or less, and may be greater than 15 degrees in the negative (−) A direction, but some example embodiments thereof is not limited thereto.

In example embodiments, the prism 1105 may move by about 20 degrees, between 10 degrees and 20 degrees, or between 15 degrees and 20 degrees in the positive (+) or negative (−) B direction, where, as for the moving angle, the prism 1105 may move by the same angle or by an almost similar angle within a range of about 1 degree in the positive (+) or negative (−) B direction.

In example embodiments, the prism 1105 may move the reflective surface 1107 of the light reflecting material in a third direction (e.g., the Z direction) parallel to the extending direction of the central axis 1106.

The OPFE 1110 may include, for example, an optical lens consisting of m (where m is a natural number) number of groups. The m number of lenses may move in the second direction Y and may change an optical zoom ratio of the camera module 1100b. For example, when a basic optical zoom magnification of the camera module 1100b is defined as Z, and the m number of optical lenses included in the OPFE 1110 are moved, the optical zoom magnification of the camera module 1100b may be changed to an optical zoom magnification of 3Z or 5Z or 7Z or higher.

The actuator 1130 may move the OPFE 1110 or the optical lens (hereinafter, referred to as "optical lens") to a specific position. For example, the actuator 1130 may adjust the position of the optical lens such that the image sensor 1142 may be disposed in a focal length of the optical lens for accurate sensing.

The image sensing device 1140 may include an image sensor 1142, a control logic 1144, and a memory 1146. The image sensor 1142 may sense an image of a sensed target using light L provided through the optical lens. The control logic 1144 may control overall operations of the camera module 1100b. For example, the control logic 1144 may control operation of the camera module 1100b according to a control signal provided via a control signal line CSLb.

The memory 1146 may store information necessary for operation of the camera module 1100b, such as calibration data 1147. The calibration data 1147 may include information necessary for the camera module 1100b to generate image data using light L provided from the outside. The calibration data 1147 may include, for example, information about a degree of rotation described above, information about a focal length, information about an optical axis, and the like. When the camera module 1100b is implemented in the form of a multi-state camera of which a focal length changes according to the position of the optical lens, the calibration data 1147 may include focal length values for each position (or each state) of the optical lens and information related to autofocusing.

The storage device 1150 may store image data sensed via the image sensor 1142. The storage device 1150 may be disposed externally of the image sensing device 1140 and may be implemented to be stacked with a sensor chip included in the image sensing device 1140. In example embodiments, the storage device 1150 may be implemented as an electrically erasable programmable read-only memory (EEPROM), but some example embodiments thereof is not limited thereto.

Referring to FIGS. 11 and 12 together, in example embodiments, each of the plurality of camera modules 1100a, 1100b, and 1100c may include an actuator 1130. Accordingly, each of the plurality of camera modules 1100a, 1100b, and 1100c may include the same or different calibration data 1147 according to operation of the actuator 1130 included therein.

In example embodiments, one camera module (e.g., 1100b) among the plurality of camera modules 1100a, 1100b, and 1100c may be configured as a folded lens-type camera module including the prism 1105 and the OPFE 1110 described above, and the other camera modules (e.g., 1100a and 1100b) may be vertical type camera modules which do not include the prism 1105 and the OPFE 1110, but some example embodiments thereof are not limited thereto.

In example embodiments, one camera module (e.g., 1100c) among the plurality of camera modules 1100a, 1100b, and 1100c may be configured as a vertical-type depth camera which may extract depth information using infrared ray (IR), for example. In some example embodiments, the application processor 1200 may merge image data provided by the depth camera with image data provided by the other camera modules (e.g., 1100a or 1100b) and may generate a 3D depth image.

In example embodiments, at least two camera modules (e.g., 1100a and 1100b) among the plurality of camera modules 1100a, 1100b, and 1100c may have different fields of view. In some example embodiments, for example, the optical lenses of at least two camera modules (e.g., 1100a and 1100b) among the plurality of camera modules 1100a, 1100b, and 1100c may be different, but some example embodiments thereof is not limited thereto. Further, in example embodiments, fields of view of the plurality of camera modules 1100a, 1100b, and 1100c may be different. In some example embodiments, the optical lenses included in the plurality of camera modules 1100a, 1100b, and 1100c may also be different, but some example embodiments thereof is not limited thereto. In example embodiments, the plurality of camera modules 1100a, 1100b, and 1100c may be physically separated from each other. In other words, an independent image sensor 1142 may be disposed in each of the plurality of camera modules 1100a, 1100b, and 1100c, rather than dividing and using the sensing area of the single image sensor 1142 by the plurality of camera modules 1100a, 1100b, and 1100c.

Referring back to FIG. 11, the application processor 1200 may include an image processing device 1210, a memory controller 1220, and an internal memory 1230. The application processor 1200 may be implemented separately from the plurality of camera modules 1100a, 1100b, and 1100c. For example, the application processor 1200 and the plurality of camera modules 1100a, 1100b, and 1100c may be separated from each other as separate semiconductor chips.

The image processing device 1210 may include a plurality of sub-image processors 1212a, 1212b, and 1212c, an image generator 1214, and a camera module controller 1216. The image processing device 1210 may also include a plurality of sub-image processors 1212a, 1212b, and 1212c corresponding to the number of the plurality of camera modules 1100a, 1100b, and 1100c.

Image data generated by each of the camera modules 1100a, 1100b, and 1100c may be provided to the corresponding sub-image processors 1212a, 1212b, and 1212c via image signal lines ISLa, ISLb, and ISLc separated from each other. For example, image data generated by the camera module 1100a may be provided to the sub-image processor 1212a via the image signal line ISLa, image data generated by the camera module 1100b may be provided to the sub-image processor 1212b via the image signal line ISLb, and image data generated by the camera module 1100c may be provided to the sub-image processor 1212c via the image signal line ISLc. Such image data transmission may be performed using, for example, a camera serial interface (CSI) based on a mobile industry processor interface (MIPI), but some example embodiments thereof is not limited thereto.

In example embodiments, a single sub-image processor may be arranged to correspond to the plurality of camera modules. For example, the sub-image processor 1212a and the sub-image processor 1212c may be integrated as a single sub-image processor, rather than being separated from each other, as illustrated, and image data provided by the camera modules 1100a and 1100c may be selected by a select device (e.g., a multiplexer) and may be provided to the integrated sub-image processor.

The image data provided to each of the sub-image processors 1212a, 1212b, and 1212c may be provided to the image generator 1214. The image generator 1214 may generate an output image using the image data provided by each of the sub-image processors 1212a, 1212b, and 1212c according to the image generating information or the mode signal. Specifically, the image generator 1214 may merge at least a portion of the image data generated by the camera modules 1100a, 1100b, and 1100c having different fields of view according to the image generation information or the mode signal. Also, the image generator 1214 may generate an output image by selecting one of image data generated by camera modules 1100a, 1100b, and 1100c having different fields of view according to the image generation information or the mode signal.

In example embodiments, the image generation information may include a zoom signal or a zoom factor. Further, in example embodiments, the mode signal may be based on a mode selected by a user, for example. When the image generation information is a zoom signal (zoom factor), and the camera module 1100a, 1100b, and 1100c have different fields of view, the image generator 1214 may perform different operations depending on a type of the zoom signals. For example, when the zoom signal is a first signal, the image data output by the camera module 1100a may be merged with the image data output by the camera module 1100c, and an output image may be generated using the merged image signal and image data output by the camera module 1100b which has not be used in the merging. When the zoom signal is a second signal different from the first signal, the image generator 1214 may not perform the image data merging, and may select one of the image data output by each camera module 1100a, 1100b, and 1100c and may generate an output image. However, some example embodiments thereof is not limited thereto, and a method of processing the image data may be varied if desired.

In example embodiments, the image generator 1214 may receive a plurality of pieces of image data having different exposure times from at least one of the plurality of sub-image processors 1212a, 1212b, and 1212c, and may perform a high dynamic range (HDR) processing on the plurality of pieces of image data, thereby generating merged image data with an increased dynamic range. At least one of the plurality of sub-image processors 1212a, 1212b, and 1212c may be configured to perform digital clock scattering when at least one of the camera modules 1100a, 1100b, and 1100c performs an analog operation, as described with reference to in FIGS. 1 to 10.

The camera module controller 1216 may provide a control signal to each of the camera modules 1100a, 1100b, and 1100c. The control signal generated by the camera module controller 1216 may be provided to corresponding camera modules 1100a, 1100b, and 1100c via control signal lines CSLa, CSLb, and CSLc separated from each other. Also, one of the plurality of camera modules 1100a, 1100b, and 1100c may be designated as a master camera (e.g., 1100b) according to image generation information including a zoom signal or a mode signal, and the other camera modules (e.g., 1100a and 1100c) may be designated as slave cameras. Such information may be included in the control signal and may be provided to corresponding camera modules 1100a, 1100b, and 1100c via the control signal lines CSLa, CSLb, and CSLc separated from each other.

Camera modules operating as masters and slaves may change depending on a zoom factor or an operation mode signal. For example, when a field of view of the camera module 1100a is wider than that of the camera module 1100b and a zoom factor exhibits a low zoom magnification, the camera module 1100b may operate as a master, and the camera module 1100a may operate a slave. Alternatively, when the zoom factor exhibits a high zoom magnification, the camera module 1100a may operate as a master and the camera module 1100b may operate as a slave.

In example embodiments, a control signal provided by the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b receiving the sync enable signal may generate a sync signal based on the received sync enable signal, and may provide the generated sync signal to the camera modules 1100a and 1100c via a sync signal line SSL. The camera module 1100b and the camera modules 1100a and 1100c may be synchronized with the sync signal and may transmit image data to the application processor 1200.

In example embodiments, the control signal provided by the camera module controller 1216 to the plurality of camera modules 1100a, 1100b, and 1100c may include mode information based on the mode signal. Based on this mode information, the plurality of camera modules 1100a, 1100b, and 1100c may operate in a first operation mode and a second operation mode in relation to a sensing speed.

In the first operation mode, the plurality of camera modules 1100a, 1100b, and 1100c may generate an image signal at a first rate (e.g., generating an image signal at a first frame rate), may encode the signal at a second rate higher than the first rate (e.g., encoding an image signal of a second frame rate higher than a first frame rate), and may transmit the encoded image signal to the application processor 1200. In some example embodiments, the second speed may be 30 times or less the first speed.

The application processor 1200 may store the received image signal, that is, the encoded image signal, in the internal memory 1230 provided therein or an external memory 1400 disposed externally of the application processor 1200, and thereafter, the application processor 1200 may decode the encoded image signal from the internal memory 1230 or the external memory 1400 and may display the image data generated based on the decoded image signal. For example, a corresponding sub-processor among the plurality of sub-image processors 1212a, 1212b, and 1212c of the image processing device 1210 may perform the decoding, and may also perform image processing on the decoded image signal.

In the second operation mode, the plurality of camera modules 1100a, 1100b, and 1100c may generate an image signal at a third rate lower than the first rate (e.g., generating an image signal of a third frame rate lower than the first frame rate), and may transmit the image signal to the application processor 1200. The image signal provided to the application processor 1200 may be an unencoded signal. The application processor 1200 may perform image processing on the received image signal or may store the image signal in the internal memory 1230 or the external memory 1400.

The PMIC 1300 may supply power, a power voltage, for example, to each of the plurality of camera modules 1100a, 1100b, and 1100c. For example, the PMIC 1300 may supply first power to the camera module 1100a via a power signal line PSLa, may supply second power to the camera module 1100b via a power signal line PSLb, and may supply third power to the camera module 1100c via the power signal line PSLc.

The PMIC 1300 may generate power corresponding to each of the plurality of camera modules 1100a, 1100b, and 1100c in response to the power control signal PCON from the application processor 1200, and may also adjust a level of power. The power control signal PCON may include a power adjustment signal for each operation mode of the plurality of camera modules 1100a, 1100b, and 1100c. For example, the operation mode may include a low-power mode, and in some example embodiments, the power control signal PCON may include information on a camera module operating in a low-power mode and a determined power level. The levels of power provided to the plurality of camera modules 1100a, 1100b, and 1100c may be the same or different. Also, the level of power may dynamically change.

As described herein, any devices, electronic devices, modules, units, controllers, circuits, camera modules, image sensors, and/or portions thereof according to any of the example embodiments, and/or any portions thereof (including, without limitation, imaging device 10, image sensing unit 100, digital processing unit 200, timing controller 170, digital clock generator 201, image signal processor 210, ramp signal generator 160, analog-to-digital conversion circuit 130, buffer 180, imaging device 20, image sensing unit 100a, digital processing unit 300, image signal processors 310, digital processing unit 400, line buffer 402, digital clock generator 401, ISPs 411 to 414, merging module 420, storing module 430, electronic device 1000, application processor 1200, image processing device 1210, image generator 1214, sub-image processors 1212a, 1212b, 1212c, camera module controller 1216, memory controller 1220, PMIC 1300, external memory 1400, internal memory 1230, image sensing device 1140, control logic 1144, image sensor 1142, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, controllers, units, camera modules, image sensors, and/or portions thereof according to any of the example embodiments, and/or any portions thereof.

Any of the memories described herein, including, without limitation, internal memory 1230, external memory 1400, memory 1146, and/or storage device 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

According to the aforementioned example embodiments, the image sensor, the image device having the same, and the method of operating the same may, by scattering a digital clock when an analog operation is performed in the image sensor, reduce fluctuations in digital power.

While some example embodiments have been illustrated and described above, it will be apparent to those skilled in the art that modifications and variations could be made without departing from the scope of the present inventive concepts as defined by the appended claims.

What is claimed is:

1. An imaging device, comprising:
    an image sensing circuitry configured to receive image signals from pixels, to convert the received image signals into image data, and to output the image data; and
    a digital processing circuitry configured to process the image data in synchronization with a digital clock,
    wherein the digital processing circuitry includes a digital clock generator configured to generate the digital clock, and
    wherein the digital clock generator is configured to scatter the digital clock, in response to the image sensing circuitry converting the image signals into the image data.

2. The imaging device of claim 1, wherein the image sensing circuitry includes
    an analog-to-digital conversion circuit configured to convert the received image signals into the image data based on comparing the image signals with a ramp signal and performing counting operations corresponding to results of the comparison; and
    a timing controller configured to generate a counter enable signal related to the counting operations.

3. The imaging device of claim 2, wherein the digital clock generator is configured to scatter the digital clock according to a particular timing sequence in response to the counter enable signal.

4. The imaging device of claim 2, wherein the digital clock generator is configured to scatter the digital clock according to a particular timing sequence in response to a horizontal synchronization signal of the timing controller.

5. The imaging device of claim 1, wherein
    the image sensing circuitry is configured to perform a first analog-to-digital conversion (ADC) operation corresponding to a reset voltage and perform a second ADC operation corresponding to a pixel voltage, and
    the digital clock generator is configured to gate the digital clock in an entire or partial period of each of
        a first ADC period corresponding to the first ADC operation, and
        a second ADC period corresponding to the second ADC operation.

6. The imaging device of claim 1, wherein
the image sensing circuitry is configured to perform a first analog-to-digital conversion (ADC) operation corresponding to a reset voltage and perform a second ADC operation corresponding to a pixel voltage, and
the digital clock generator is configured to divide the digital clock in an entire or partial period of each of
a first ADC period corresponding to the first ADC operation, and
a second ADC period corresponding to the second ADC operation.

7. The imaging device of claim 1, wherein
the image sensing circuitry is configured to perform a first analog-to-digital conversion (ADC) operation corresponding to a reset voltage and perform a second ADC operation corresponding to a pixel voltage, and
the digital clock generator is configured to
gate the digital clock in a partial period of each of a first ADC period corresponding to the first ADC operation, and a second ADC period corresponding to the second ADC operation, and
divide the digital clock in another period of each of the first ADC period and the second ADC period.

8. The imaging device of claim 1, wherein
the image sensing circuitry is configured to perform a first analog-to-digital conversion (ADC) operation corresponding to a reset voltage and perform a second ADC operation corresponding to a pixel voltage, and
the digital clock generator is configured to scatter the digital clock in
a first stall period including a first ADC period corresponding to the first ADC operation, and
a second stall period including a second ADC period corresponding to the second ADC operation.

9. The imaging device of claim 8, wherein
each of the first ADC period and the second ADC period is divided into a plurality of clock scattering periods, and
in the plurality of clock scattering periods, the digital clock is scattered by different schemes.

10. The imaging device of claim 8, wherein
each of the first ADC period and the second ADC period is divided into a plurality of clock scattering periods, and
in at least two of the plurality of clock scattering periods, the digital clock is divided according to different clock division ratios.

11. A method of operating an imaging device, the method comprising:
converting an image signal into image data based on performing a counting operation until the image signal and a ramp signal equalize; and
reducing consumption of digital power using a clock scattering scheme in response to the counting operation being performed.

12. The method of claim 11, wherein the clock scattering scheme includes gating or dividing a digital clock used in an image sensing circuitry of the imaging device or a digital processing circuitry of the imaging device.

13. The method of claim 12, wherein
the converting into the image data includes performing a first analog-to-digital (ADC) operation corresponding to a reset voltage, and performing a second ADC operation corresponding to a pixel voltage, and
the reducing the consumption of the digital power includes gating or dividing the digital clock in an entire or partial period of a first ADC period corresponding to the first ADC operation and a second ADC period corresponding to the second ADC operation.

14. The method of claim 13, further comprising:
transmitting the image data to a plurality of image signal processors connected to each other in series,
wherein each of the plurality of image signal processors does not process data processed in a first stall period corresponding to the first ADC operation and a second stall period corresponding to the second ADC operation.

15. The method of claim 11, wherein, in the clock scattering scheme, a clock gating period, a clock division period, or a clock division ratio is determined based on a user setting.

16. An imaging device, comprising:
a pixel array having a plurality of pixels arranged in a plurality of row lines and a plurality of column lines;
a row driver configured to select one row line of the plurality of row lines;
an analog-to-digital conversion circuit configured to covert analog signals output by the pixel array into digital data;
a digital clock generator configured to generate a transfer clock for transmitting the digital data to an image signal processor; and
a timing controller configured to control timing of the pixel array, the row driver, the analog-to-digital conversion circuit, and the digital clock generator,
wherein the analog-to-digital conversion circuit includes a comparator circuit having comparators for comparing pixel signals output by the pixel array with a ramp signal, and a counter circuit having counters configured to count an output of each comparator of the comparators, and
wherein the digital clock generator is configured to scatter the transfer clock in response to a horizontal synchronization signal or a counter enable signal received from the timing controller.

17. The imaging device of claim 16, wherein the digital clock generator is configured to gate or divide the transfer clock in response to the counters being enabled.

18. The imaging device of claim 16, wherein scattering of the transfer clock is determined according to a user setting.

19. The imaging device of claim 16, wherein the transfer clock is scattered based on a gated clock scheme or a divided clock scheme.

20. The imaging device of claim 19, wherein the transfer clock is scattered based on the gated clock scheme or the divided clock scheme in a partial or entire period in which the counters are enabled.

* * * * *